Dec. 9, 1930.  J. LALEY  1,784,490
PROCESS FOR THE RECOVERY OF THE TIN CONTAINED
IN THE RESIDUES OF TIN PLATE MANUFACTURE
Filed April 3, 1928

INVENTOR:
Jehan Laley
BY: Ruger, Bayes + Bakeler
ATTORNEYS.

Patented Dec. 9, 1930

1,784,490

UNITED STATES PATENT OFFICE

JEHAN LALEY, OF HAYANGE, FRANCE, ASSIGNOR TO LES PETITS FILS DE FRANCOIS DE WENDEL & CIE., OF PARIS, FRANCE

PROCESS FOR THE RECOVERY OF THE TIN CONTAINED IN THE RESIDUES OF TIN-PLATE MANUFACTURE

Application filed April 3, 1928, Serial No. 266,886, and in France January 23, 1928.

The present invention relates to a process for the recovery of the tin contained in the residues from the manufacture of tin plate.

It is known that, in the crucibles and other receptacles which are used in the manufacture of tin plate, impurities, mixed or combined with tin, collect at the bottom and that such accumulations of impure tin must be removed from time to time from said receptacles because they would be detrimental to a proper tinning.

Such residues contain prills of tin, tin-iron alloys, tin oxide and other tin compounds, fat, zinc chloride, gypsum plaster, etc. The following example of a tin alloy found at the bottom of crucibles may be given:

|    | Per cent |
|----|----------|
| Pb | 0.07 |
| Bi | 0.06 |
| Cu | 0.06 |
| Fe | 5.85 |
| Zn | 0.02 |
| Sn | 93.94 |

The invention is concerned with the treatment of this class of residues and it has for its object to provide an improved process by which the tin can be entirely separated from the impurities. The invention has also for its object to provide an improved process which permits to treat very rapidly all the residues obtained from the daily or weekly cleaning of an apparatus for tin plate manufacture, whatever may be the amount of impurities contained therein. It is another object of the invention to devise a new process by which the loss of metal by oxidation and volatilization occurring in the usual reduction processes in the reverberatory furnace is materially reduced or eliminated.

The process according to the invention chiefly consists in subjecting the oil and other impurities contained in the tin residues to the action of a basic liquid with the application of heat, in separating by screening the sludge from the tin and impure tin alloy which result from this treatment, and in treating separately the tin and impure tin alloy on the one hand, and the sludge on the other hand by reduction in a furnace process.

In carrying out my process, the residues are well stirred and mixed in a rotary trommel which is immersed in a basic solution contained in a steam-heated vat. The saponified oil and other impurities are disaggregated or emulsified by the disengagement of gas which occurs. Thus, in a quarter of an hour at the maximum, all impurities such as the oil, zinc chloride, gypsum plaster, and the like, are removed, and the tin and the impure tin alloy are readily detected, due to their characteristic metallic aspect. The saponified oil and the light impurities are expelled from the trommel by centrifugal force, and then rise to the surface of the liquid in the vat. The heavier impurities separate by gravity and fall to the bottom of the vat through the holes in the trommel. Only the pure tin and the impure tin alloy remain in the trommel.

This process thus enables to sort the various substances forming the residues into three distinct portions of very different values.

1. Tin and tin-iron alloy without a substantial amount of impurities, except the very small amount of metals and metalloids included in the alloy. For example, a chemical analysis of such an alloy has given the following composition:

|    | Per cent |
|----|----------|
| Pb | 0.068 |
| Bi | 0.059 |
| Cu | 0.058 |
| Fe | 5.852 |
| Zn | 0.019 |
| Sn | 93.944 |

Some alloys of this class contain more than 10% of iron (Fe) and their aspect is more dull than pure tin.

2. Sludge formed by the heavy impurities.

Said sludge has for example the following composition:

The dry residue contains

| | Per cent |
|---|---|
| Moisture | 35.10 |
| Sn in prills | 5. |
| SnO | 6.32 |
| SnO$_2$ | 20.27 |
| ZnO | 9.87 |
| ZnCl$_2$ | 0.37 |
| Fe$_3$O$_4$ | 5.34 |
| SO$_4$Ca | 3.03 |
| CO$_3$Ca | 5.61 |
| Refractory substances | 1.26 |
| Carbon, fatty materials, combined water | 40.50 |
| Not determined (alkalis, etc.) | 2.43 |
| | 100.00 |

The composition of the sludge depends on the diameter of the holes or upon the density of the meshes of the trommels in use. The above example refers to the case of a finishing trommel of wire netting having 40 meshes per sq. centimeter.

3. Scum formed by the saponified or emulsified substances.

The sludge also contains very small grains or prills of tin which passed through the holes in the trommel.

The scum only contains tin in the state of oxide, or of tin powder.

The analysis shows that the bath used in the operation contains but traces of tin, and that over 90 per cent of the metallic tin in the residues can be separated from all the impurities. The rest (10%) corresponds to the grains or prills of tin which have a smaller diameter than the holes in the trommel, and to the oxide of tin which is drawn off with the emulsion.

The three classes of products thus separated are then treated in a reverberatory furnace of the type commonly employed in tin factories. To obtain the proper results, it is quite essential to treat each product separately in a reverberatory furnace, in a reducing atmosphere.

These three treatments are as follows:

1. *Treatment of the tin and tin alloy without a substantial amount of impurities.*—Preferably, the tin and tin alloy are dried after the wet treatment, prior to the loading into a reverberatory furnace of the type usually employed for reduction of tin ore. When sufficiently dry, the furnace is filled and the air inlets below the hearth are carefully obturated. The tin melts at once, and flows out until it is exhausted. I readily treat loads of 300–400 kgs. in the furnace, and the treatment lasts for about 1½ hours.

B. *Treatment of the sludge.*—The roasting of this sludge, which contains a large amount of moisture, (some 35 per cent) is performed in a reverberatory furnace, in a reducing atmosphere. By a continual stirring of the mass, it is possible to recover 8 per cent of metallic tin; the residue consists of tin ashes, having for example the following composition:

| | Per cent |
|---|---|
| Sn SnO | 35.68 |
| SnO$_2$ | 14.38 |
| ZnO | 8.49 |
| ZnCl$_2$ | 0.44 |
| Fe$_3$O$_4$ | 6.08 |
| SO$_4$Ca | 3.21 |
| CO$_3$Ca | 7.17 |
| C | 2.03 |
| Refractory substances | 5.26 |
| Not determined (alkalis, etc.) | 17.26 |

C. *Treatment of the scum.*—Although the scum contains only a small amount of tin, in the form of oxide, it can be treated with profit in the reverberatory furnace. It is preferably introduced into the furnace at the end of an operation, and, since it contains much volatile matter, and chiefly saponified oil, it burns slowly, thus maintaining the furnace at the proper temperature without requiring the attendance of the refiner.

The small amount of residue from this treatment contains tin from the reduction of a part of the tin oxide by oil, and tin ashes which are poor in tin (25 per cent of tin as oxide).

From the foregoing, it will be noted that my process will offer various advantages, viz.

1. The pure tin and tin alloy substantially freed from impurities may now be treated separately in the reverberatory furnace in a reducing atmosphere, to reduce the tin oxide, and I thus obviate all losses of tin by oxidation and volatilization which is always the case with the known methods in which the mass must be constantly stirred.

2. The tin obtained, after it is refined, is purer than the tin produced by the old process, and I thus obviate the second refining and the stirring of the tin resulting from the first refining, which was indispensable in the old process.

A typical analysis of the tin recovered by my process is as follows:

| | Per cent |
|---|---|
| Sn | 99.9826 |
| Fe | 0. |
| Zn | 0.004 |
| Pb | 0.0063 |
| As | 0.0070 |

Other impurities, CU, S, Sb, traces.

This shows that one of the two usual refining operations may be dispensed with, and that the tin obtained is plant purer than usual and can be used directly in the tinning.

3. A large amount of tin ashes of the best quality is obtained, since the sludge is roasted independently of the tin and tin alloy. Only the volatile substances are burned, and the tin oxide remains almost entirely incorporated with the ash.

4. The amount of zinc in the ashes is small.

5. The work is easier and more rapid, and does not require specially skilled labour.

An example of the operation which is performed for the recovery of the tin contained in tin residues is given below.

Herein the bath consists of 10 kgs. of caustic soda and 10 kgs. of neutral sodium carbonate dissolved in 500 liters of water, thus having a density of about 7 degrees Bé. With this bath I can treat two charges of about 200 kgs. of residues each.

While the soda and the neutral sodium carbonate are dissolving, and while introducing the crude residues into the trommel, the bath is heated by a jet of steam. When the temperature of the bath reaches 70° C., the reaction starts. The trommel is then rotated and the temperature is kept at about 80 degrees C. during the whole operation which lasts for 15 minutes at the maximum. The end of the operation can be appreciated when the sound made by the metallic tin rolling on the inside of the trommel is distinctly heard. It can be ascertained that the operation is complete by looking into the trommel and observing whether the particles of tin are properly clean and bright.

In order that the wet treatment be performed in a proper and efficient manner, two trommels should be employed: 1, a trommel for rough treatment, with 7 millimeter holes, and 2, a finishing trommel with 1 millimeter holes.

When the operation in the first trommel is completed, the scum is removed with a ladle and is treated in a reverberatory furnace as above stated. The liquid is drawn off from the vat after treatment, and the sludge at the bottom of the vat is removed with a shovel and fed into a second trommel for the second treatment.

If the wet treatment is operated in the manner described, that is rapidly and without an excess of caustic soda, the amount of sodium stannate produced is quite negligible. The analysis of the liquids which have been used for the treatment only shows some milligrams of sodium stannate per cubic meter.

Moreover, the scum and exhausted liquids being collected in settling tanks near the trommels, the sodium stannate and tin hydrate which may be present are deposited in said tanks together with the scum and the materials in suspension and the liquid which is discharged from the tank only shows traces of tin per cubic meter.

If the amount of sodium stannate and tin hydrate produced during the operation due to an excess of caustic soda appears excessive, this may be precipitated by a small amount of sulfuric acid poured into the settling tank.

In any way, the slight amount of sodium stannate which may be present and has thus been precipitated is treated with the scum and recovered in the form of ashes, so that the loss of tin in the wet treatment is practically null.

In the appended drawing which shows by way of example an apparatus which may be utilized for the wet treatment:

Figure 1:
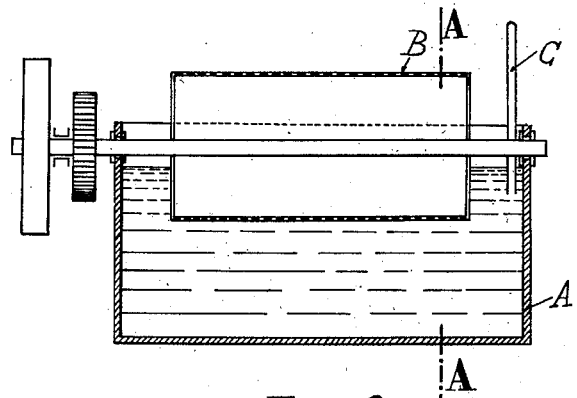
Fig. 1 is a lengthwise section of a vat with its trommel.
Figure 2:
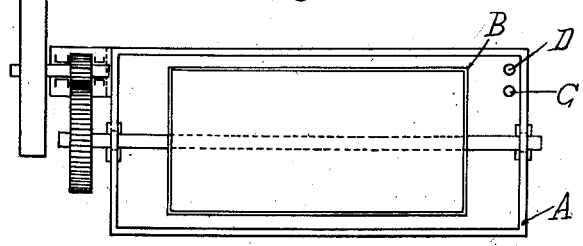
Fig. 2 is the corresponding plan view.
Figure 3:
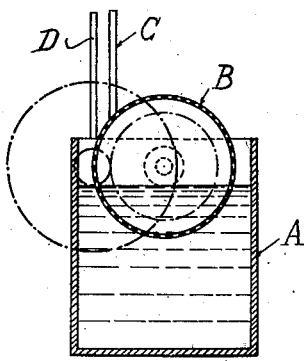
Fig. 3 is a section on the line A—A of Fig. 1.

The apparatus comprises a cast iron vat A adapted to contain the basic liquids, and in which is rotatably mounted a cylindrical trommel B of suitable size and shape. A steam pipe C by which the bath can be properly heated dips in the liquid in the vat. The trommel B is driven by an electric motor which rotates at about 33 revolutions per minute. D denotes a water pipe for washing purposes.

The apparatus for carrying out my process is of a very simple construction. By the use of two trommels, as above stated, I am enabled to easily treat in less than 8 hours the entire output of a tin plate factory whose daily output is 50 tons of tin plate. It should be further noted that a single workman, in a period of 8 hours, can attend to the whole wet treatment.

I obtain a refined metal in a very pure state, and I practically recover all the particles of tin either in the metallic state or in the form of tin ashes.

Having now described my invention, what I claim as new and desire to secure by Letters Patent is:

1. A process for the recovery of the tin contained in the residues of tin plate manufacture of the class referred to, which consists in causing a basic liquid in the hot state to act upon the oil and other impurities contained in said residues, in separating by screening the sludge from the tin and impure tin alloy which result from said treatment, and in treating separately the tin and impure tin alloy on the one hand in a furnace, and the sludge on the other hand by reduction in a furnace.

2. A process as claimed in claim 1, which further consists in recovering the scum from the basic liquid treatment and recovering tin therefrom by reduction in a furnace.

In testimony whereof I have signed my name to this specification.

JEHAN LALEY.